United States Patent
de Ruijter et al.

(10) Patent No.: US 9,013,975 B2
(45) Date of Patent: Apr. 21, 2015

(54) RECEIVER WITH COLLISION DETECTION AND METHOD THEREFOR

(75) Inventors: Hendricus de Ruijter, Sunnyvale, CA (US); Wentao Li, Mountain House, CA (US)

(73) Assignee: Silicon Laboratories Inc., Austin, TX (US)

( * ) Notice: Subject to any disclaimer, the term of this patent is extended or adjusted under 35 U.S.C. 154(b) by 416 days.

(21) Appl. No.: 13/595,924

(22) Filed: Aug. 27, 2012

(65) Prior Publication Data

US 2013/0083648 A1   Apr. 4, 2013

Related U.S. Application Data

(60) Provisional application No. 61/542,138, filed on Sep. 30, 2011.

(51) Int. Cl.
*H04L 12/28* (2006.01)
*H04L 1/00* (2006.01)
*H04L 7/00* (2006.01)
*H04L 29/14* (2006.01)
*H04L 7/04* (2006.01)
*H04W 74/08* (2009.01)

(52) U.S. Cl.
CPC ............ *H04L 1/0045* (2013.01); *H04L 7/0054* (2013.01); *H04W 74/0858* (2013.01); *H04L 69/40* (2013.01); *H04L 7/042* (2013.01)

(58) Field of Classification Search
USPC ........ 370/216, 349, 345, 445; 455/226.1, 509
See application file for complete search history.

(56) References Cited

PUBLICATIONS

Silicon Laboratories Inc.; "Wireless MBUS Implementation Using EZRadioPRO Devices"; Application Note; Oct. 2009; pp. 1-18; AN361, Rev. 1.0; Silicon Laboratories Inc., 400 W. Cesar Chavez, Austin, TX 78701.

*Primary Examiner* — Dang Ton
*Assistant Examiner* — Lionel Preval
(74) *Attorney, Agent, or Firm* — Cesari & Reed LLP; R. Michael Reed

(57) ABSTRACT

A method of handling a collision event between a first and second transmission includes detecting a collision event between the first and second transmissions while processing the first transmission at a receiver. The method further includes halting decoding of the first transmission in response to detecting the collision, adjusting receive parameters to receive the second transmission, and detecting a preamble portion of the second transmission using the adjusted receive parameters.

20 Claims, 4 Drawing Sheets

RECEIVER WITH COLLISION DETECTION AND METHOD THEREFOR

CROSS-REFERENCE TO RELATED APPLICATION(S)

This application is a non-provisional patent application of and claims priority to U.S. Provisional Patent Application No. 61/542,138 filed on Sep. 30, 2011 and entitled "Receiver with Collision Detection and Method Therefor", which is incorporated herein by reference in its entirety.

FIELD

The present disclosure is generally related to receiver circuits for receiving data packets, and more particularly to receiver circuits configured to detect collisions.

BACKGROUND

In some wireless circuits, such as meter reading circuits and various passive receivers, transmitting devices can transmit data packets at any time. Collisions occur when the receiver receives a second data packet from a device during a period of time that it is processing a previously received first data packet. The second data packet causes the collision, which can corrupt the first data packet. In some instances, both packets may be lost as a result of the collision.

SUMMARY

In an embodiment, a method of handling a collision event between a first and second transmission includes detecting a collision event between the first and second transmissions while processing the first transmission at a receiver. The method further includes halting decoding of the first transmission in response to detecting the collision, adjusting receive parameters to receive the second transmission, and detecting a preamble portion of the second transmission using the adjusted receive parameters.

In another embodiment, a receiver circuit includes a demodulator configured to receive a first signal and to demodulate the first signal to produce a demodulated signal and a data handler coupled to the demodulator and configured to process the demodulated signal to extract data. The receiver circuit further includes a collision detector coupled to the demodulator and configured to detect a collision event between the first signal and a second signal. The collision detector is configured to provide an a collision detection signal in response to detecting a collision event. Further, the receiver circuit includes a controller coupled to the demodulator and the collision detector. The controller is configured to adjust parameters of the demodulator to detect the second signal in response to the collision detection signal.

In another embodiment, a receiver includes a decoder having an input for receiving a first signal transmission and configured to detect at least one of a preamble, a synchronization word, and a payload of the signal. The receiver further includes a controller configured to detect a collision event between the first signal transmission and a second signal transmission, to adjust one or more receive parameters of the decoder, and to enable the decoder to detect a preamble of a second signal transmission in response to detecting the collision event.

BRIEF DESCRIPTION OF THE DRAWINGS

In the following discussion, the same reference numerals are reused to indicate the same or similar elements in different figures.

DETAILED DESCRIPTION OF ILLUSTRATIVE EMBODIMENTS

An embodiment of a receiver is disclosed that is configured to detect a collision event, where a signal causes corruption of a first structured data transmission, and to adjust parameters of the receiver in response to detecting the collision event in order to receive a second packet if the second signal includes a second structured data transmission. In an example, the receiver detects another transmission based on a sudden increase in the received signal strength. In response to detecting the sudden increase, the receiver stops analyzing a current structured data transmission, adjusts the receive parameters, and begins detecting a next structured data transmission using the adjusted receive parameters.

As used herein, the term "structured data transmission" refers to data that is formatted for transmission in such a way that it includes defined portions. Packets and frames are two types of such structured data transmissions. The term "frame", for example, refers to data-link layer protocol data unit representing one type of structured data transmission that has pre-defined fields. The term "packet", for example, refers to another type of structured data unit that can include both data and control information. Other types of structured data transmissions may also be used, including serial data streams having pre-defined structures. The following discussion continues to use the terms "frame" and "packet"; however, the circuits and methods for collision detection and for re-synchronization for capturing the colliding packet is also applicable to other structured data types.

Figure 1:
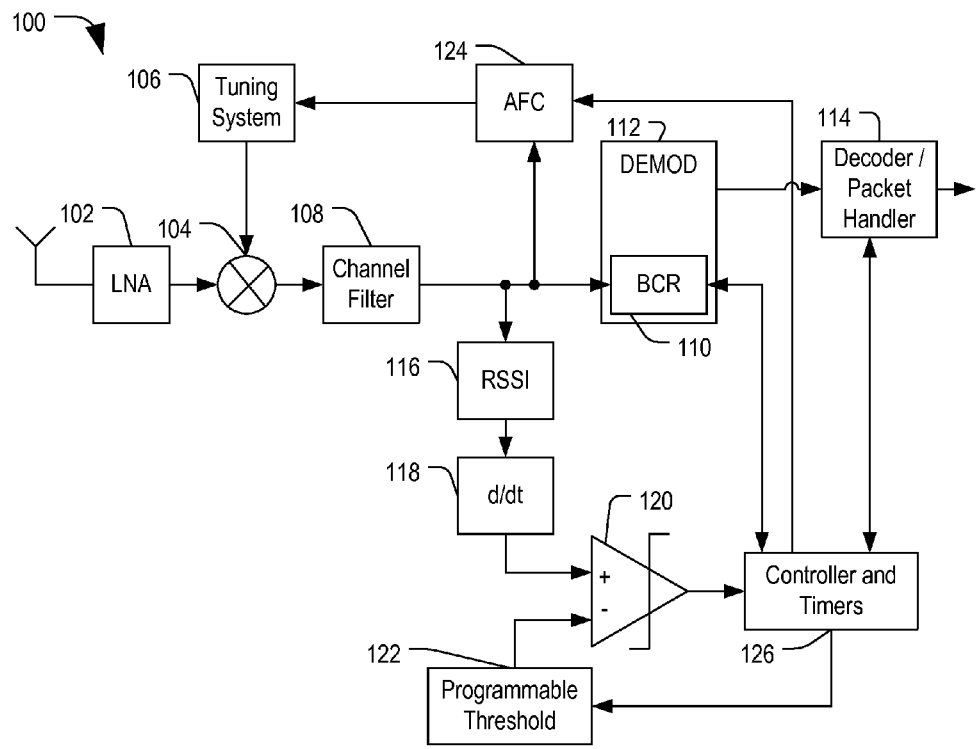
FIG. 1 is a block diagram of an embodiment of a receiver including a packet handler circuit for providing collision detection.

FIG. 1 is a block diagram of an embodiment of a receiver 100 including a packet handler circuit for providing collision detection. Receiver 100 is designed to operate with a wide range of packet structures and data protocols. One common operational scenario is a Time Division Duplex (TDD) mode with a Packet Data structure consisting of a Preamble (e.g. several bytes of a repetitive "0101" pattern), a Sync word (e.g. 1 to 4 bytes of a unique data pattern associated with only one specific link), and a Payload (multiple bytes containing the information to be transmitted over the link).

Receiver 100 includes an antenna coupled to an input of a low noise amplifier (LNA) 102, which has an output coupled to a mixing node 104. Mixing node 104 includes an input coupled to an output of a tuning system 106 and an output coupled to an input of a channel filter 108. Channel filter 108 includes an output coupled to an input of an automatic frequency compensation (AFC) circuit 124, an input of a demodulator 112, and an input of a received signal strength indicator (RSSI) circuit 116. AFC circuit 124 includes a control input and includes an output coupled to a control input of tuning system 106. AFC circuit 124 controls a frequency of tuning system 106, so that tuning system 106 applies an appropriate signal to mixing node 104 for mixing with the signal from the output of LNA 102.

RSSI circuit 116 includes an output coupled to an input of a differentiator 118, which has an output coupled to a first input of a comparator 120. Comparator 120 includes a second input coupled to a programmable threshold 122, and an output coupled to a controller and timer circuit 126. Controller and timer circuit 126 includes a first control output coupled to programmable threshold 122, a second control output coupled to a bit clock recovery (BCR) circuit 110 within demodulator 112, and a third control output coupled to the control input of AFC 124. Further, controller and timer circuit 126 is coupled to decoder 114, which includes an input coupled to an output of demodulator 112 and an output for providing a decoded audio or data signal. In an embodiment, RSSI differentiator 118 and comparator 120 each have programmable thresholds (such as programmable threshold 122) that are programmable to optimize for reliable collision detection without false triggering, which may be initiated by propagation fading. In one embodiment, these thresholds may be programmed once to comply with the fading and receive parameter conditions, such as on startup. Alternatively, the thresholds can be made adaptive depending on measurements done during receive operations. In an example, programmable threshold 122 may be increased by controller and timers circuit 126 after a pre-determined number of invalid preamble and/or sync detections.

In operation, receiver 100 receives a signal at the antenna, which signal is amplified by LNA 102 and mixed by mixing node 104 based on a local oscillator signal from tuning system 106 and filtered by the channel filter 108 before being provided to the bit clock recovery circuit 110. Bit clock recover circuit 110 uses transitions in the preamble pattern of the received packet to acquire bit timing using BCR 110, which bit timing is used by controller and timers circuit 126 to automatically correct for any frequency error in the link (Automatic Frequency Correction or AFC) and automatically adjust the gain of the receiver to correspond to the level of the received signal (Automatic Gain Control or AGC). In most applications, receiver 100 has no a priori knowledge of the timing of the transmitted packet, so acquisition starts anew with each packet.

In general, the acquisition process described here (BCR/AFC/AGC) takes some time to complete, during which the reception of the bits may be imperfect. In some instances, the first bits of the incoming data packet may be lost as the receiver 100 attempts to acquire bit timing using BCR 110. In other instances, receiver 100 may capture another transmission while a first packet is being processed. Such reception may corrupt the first packet, causing data to be lost.

Receiver 100 detects the second packet and synchronization sequence in conjunction with an abrupt increase in the received signal strength, which is detected by RSSI circuit 116 and provided to RSSI differentiator 118 (which may be implemented as a finite impulse response (FIR) filter). In response to an abrupt change in the RSSI, receiver 100 stops the decoding of the current frame and starts detecting a new frame. In particular, controller and timers circuit 126 adjust the BCR 110, decoder 114, and other parameters after detecting a collision to reset the receiver 100 for receiving the new packet.

In the illustrated example, when a first packet is being processed, a second packet may be received at the same time, causing a collision event. In this instance, the second packet, which is causing the collision, is likely to have different properties regarding the frequency offset, modulation phase, modulation frequency, and the like. By adjusting parameters, controller and timers circuit 126 operates to substantially improve the reception sensitivity.

In the illustrated embodiment, RSSI differentiator 118 and comparator 120 are used to detect the collision. When the output of RSSI differentiator 118 exceeds the programmable threshold 122, the comparator 120 provides a "collision detect" signal to controller and timers circuit 126. When a collision is detected, the controller and timers circuit 126 changes parameters of the AFC 124 to frequency lock to the colliding packet in a timely manner, changes parameters of BCR 110 to phase lock to the modulation of the colliding packet in a timely manner, enables a preamble detector of decoder/packet handler 114 to detect the preamble of the colliding packet, and initiates at least a first timer.

If no preamble is detected before the first timer exceeds a threshold, controller and timers circuit 126 does not detect a valid preamble, so controller and timers circuit 126 may reset the receiver 100 for a next packet or receiver 100 may be disabled or may enter a low duty cycle mode to reduce power consumption. Otherwise, when the preamble is detected, controller and timers circuit 126 enables a sync word detector and starts a second timer. If a sync word is not received before the second timer exceeds a threshold, controller and timers circuit 126 determines that "no valid sync-word detected". When no valid preamble or sync word is detected, receiver 100 may be disabled or may enter a low duty cycle mode to reduce power consumption.

Figure 2:
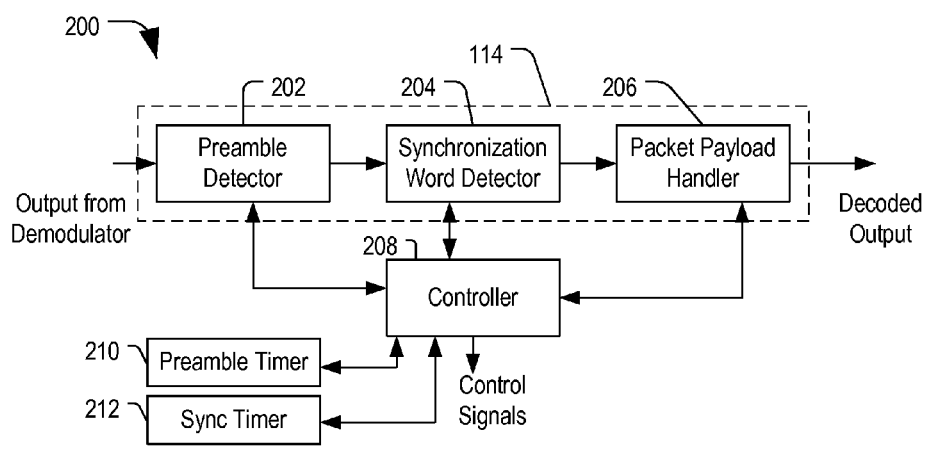
FIG. 2 is a block diagram of a portion of the receiver of FIG. 1, including the packet handler circuit.

FIG. 2 is a block diagram of a portion 200 of receiver circuit 100 of FIG. 1 including the decoder/packet handler circuit 114. Decoder/packet handler circuit 114 includes a preamble detector 202 having an input for receiving an output from the demodulator 112 and having an output coupled to an input of a synchronization word detector 204. Synchronization word detector 204 has an output coupled to an input of a packet payload handler 206, which has an output for providing a decoded output signal.

Preamble detector 202, synchronization word detector 204, and packet payload handler 206 are coupled to controller 208, which is coupled to a preamble (first) timer 210, a sync (second) timer 212, and to other circuits, such as AFC 124, BCR 110, programmable threshold 122, and other components. Controller 208, preamble timer 210, and sync timer 212 are part of the controller and timers 126 in FIG. 1.

In an example, controller 208 enables preamble detector 202 to detect the preamble of a packet. In response to a collision, controller 208 controls packet payload handler 206 to discontinue processing and enables the preamble detector 202 to detect the preamble of the packet causing the collision, and initiates preamble timer 210. If a value of preamble timer 210 exceeds a first threshold before preamble detector 202 detects a valid preamble, controller 208 determines that no packet is received and resets preamble detector 202 for a next packet. After a period of time, controller 208 may control receiver circuit 100 to enter a low-power mode.

Otherwise, after the preamble is detected before expiration of preamble timer 210, controller 208 enables synchronization word detector 204 and starts sync timer 212. If synchronization word detector 204 fails to detect a valid sync word before a value of sync timer 212 exceeds a second threshold, controller 208 determines that no valid sync word is detected and resets preamble detector 202 for a next packet. After a period of time, controller 208 may disable receiver circuit 100 or may control receiver circuit 100 to enter a low duty cycle mode to reduce power consumption. Otherwise, if a valid sync word is detected, controller 208 enables packet payload handler 206 to process the received packet to produce the decoded output.

In some instances, the collision detector (including RSSI circuit 116, RSSI differentiator 118, programmable threshold 122, and comparator 120) may also include a form of preamble detection. This preamble detection may be particularly useful when the physical transport layer (PHY) guarantees no preamble sequences in anything other than the preamble. Thus, a preamble detection can be used, an RSSI detection (e.g. differentiator and comparator) or a combination thereof. Alternatively, preamble and sync word detection may be performed concurrently with processing of the packet, such that receive of a new preamble may trigger controller 208 to halt processing of the packet and adjust receive parameters to receive the new packet.

Figure 3:
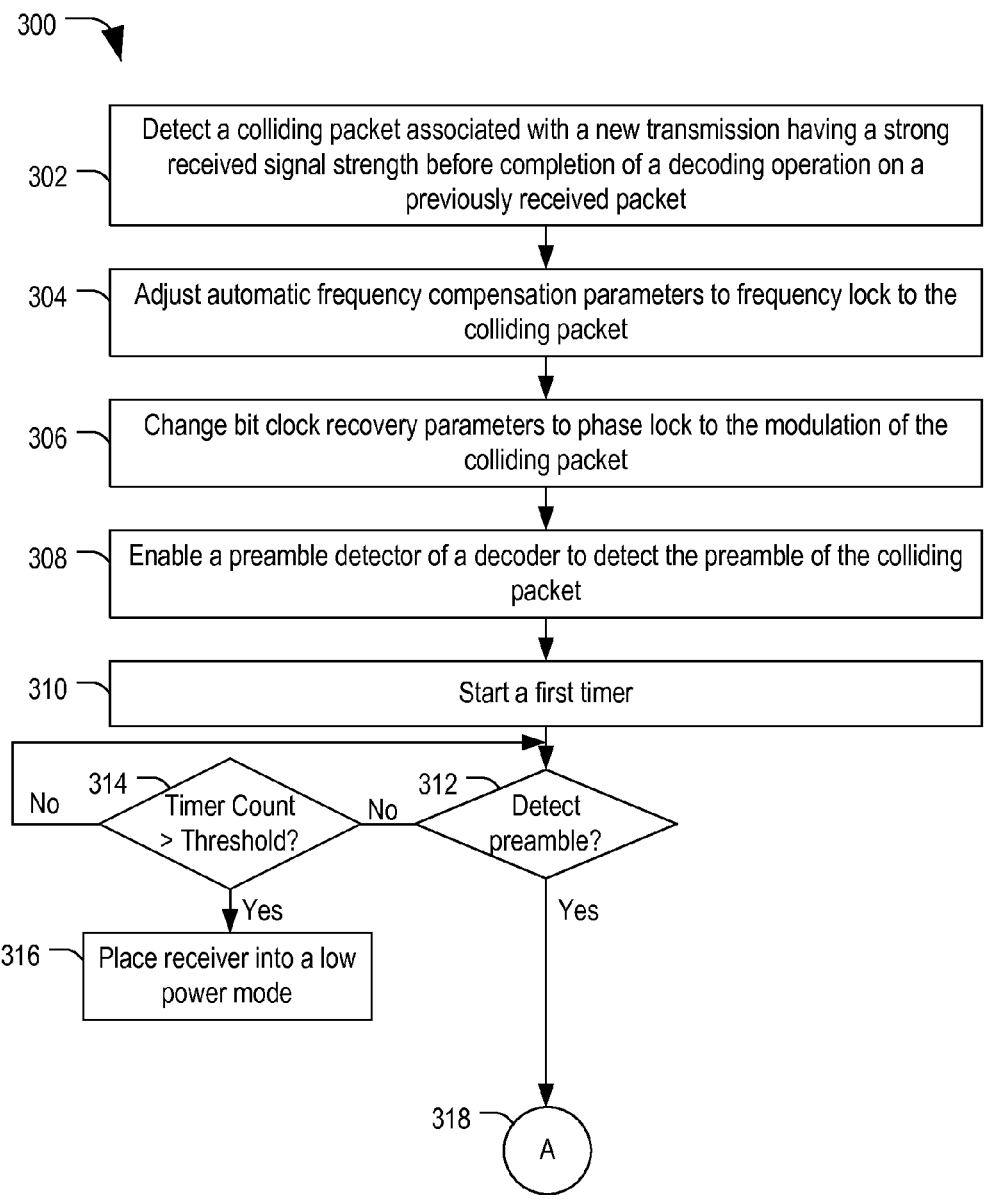
FIGS. 3-4 depict a flow diagram of an exemplary embodiment of a method of providing collision detection using the packet handler circuits of FIGS. 1 and 2.
Figure 4:
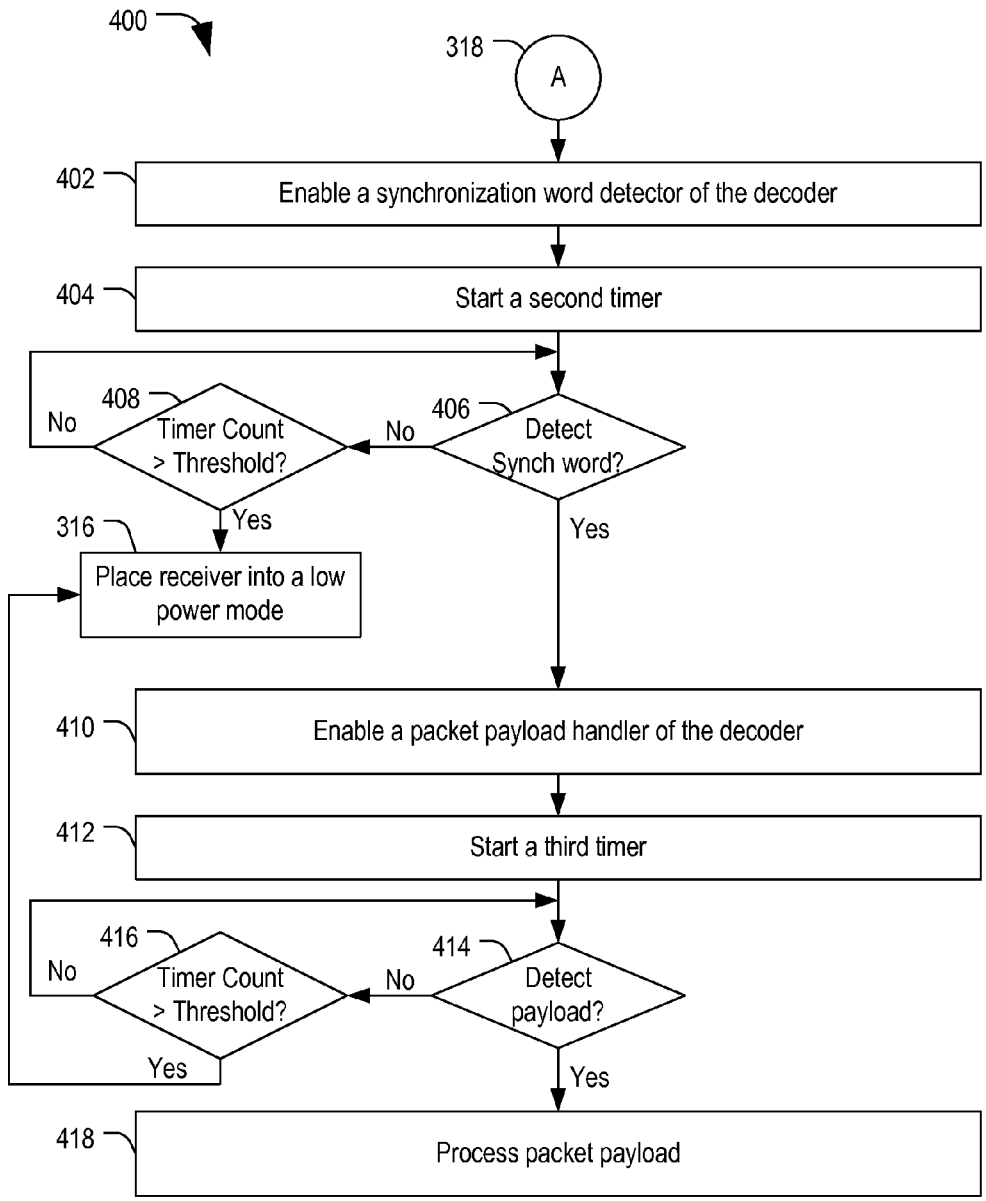

FIGS. 3-4 depict a flow diagram according to an exemplary embodiment of a method of providing collision detection using the receiver circuitry of FIGS. 1 and 2. FIG. 3 depicts a method 300 for enabling a preamble detector in response to detecting a collision event. At 302, receiver circuit 100 detects a colliding packet associated with a new transmission having a strong RSSI before completion of a decoding operation on a previously received packet. Advancing to 304, controller 208 adjusts the automatic frequency compensation parameters (of AFC 124 in FIG. 1) to frequency lock to a frequency of the colliding packet. Continuing to 306, controller 208 changes bit clock recover (BCR) parameters (of BCR 110 of FIG. 1) to phase lock to the modulation of the colliding packet. Moving to 308, controller 208 enables a preamble detector 202 to detect the preamble of the colliding packet. Proceeding to 310, controller 208 starts a first timer (preamble timer 210).

Continuing to 312, if the preamble is not detected, the method 300 advances to 314, and if the timer count of the preamble timer 210 is greater than a first threshold, the method 300 advances to 316 and controller 208 places receiver 100 in low-power state (such as a disabled state or a low duty-cycle state). In an alternative embodiment, controller 208 may be configured to generate an error signal and/or notify a host processor about the failed reception of the structured data transmission.

If, at 314, the timer count of preamble timer 210 is less than the threshold, the method 300 returns to 312 and to continues to check for the preamble. Otherwise, at 312, if a preamble is detected, the method 300 advances to 318, which is discussed in FIG. 4.

FIG. 4 depicts a flow diagram of a method 400 of processing a packet starting at 318 after detection of a valid preamble. At 402, controller 208 enables synchronization word detector 204 of decoder/packet handler 114. Advancing to 404, controller 208 starts a second timer (sync timer 212). Moving to 406, if no sync word is detected, the method 400 proceeds to 408. At 408, if the value of sync timer 212 exceeds a threshold, the method 400 advances to 316 and controller 208 places receiver 100 in low-power state (such as a disabled state or a low duty-cycle state). Otherwise, at 408, if the value of sync timer 212 is less than the threshold, the method 400 returns to 406, and controller 208 and synchronization word detector 204 continues to monitor for a sync word within the colliding packet.

At 406, if a sync word is detected, the method 400 continues to 410 and controller 208 enables a payload packet handler 206 of decoder/packet handler 114. Moving to 412, controller 208 starts a third timer. Advancing to 414, if a payload is detected, the method 400 proceeds to 418 and the packet payload is processed to produce a decoded output. Otherwise, at 414, if not payload is detected, the method 400 advances to 416. At 416, if a value of the third timer is less than a threshold, the method 400 returns to 414 and the packet payload handler continues to monitor for a payload portion of the packet. Otherwise, at 416, if the value of the third timer exceeds a threshold, the method 400 continues to 316 and controller 208 places receiver 100 in low-power state (such as a disabled state or a low duty-cycle state).

The illustrated example in FIGS. 3 and 4 represent one possible implementation of a method for collision detection. However, the method 400 can be used with or without method 300 in FIG. 3. In an example, when a collision is detected, method 400 can be used to receive the colliding frame. In an example, when the preamble is short, method 300 may not be very reliable and so the preamble detection part (method 300) can be skipped.

While the above-discussion has been directed to an exemplary circuit arrangement, it should be appreciated that the collision detection and re-synchronization to the colliding packet may be implemented in hardware, in software executing on a processor (such as a microcontroller unit (MCU), a digital signal processor (DSP), a microprocessor, or other processing circuit), or any combination of parts or all thereof. An example of a receiver circuit configurable to perform collision detection and to resynchronize to the colliding packet is described below with respect to FIG. 5.

Figure 5:
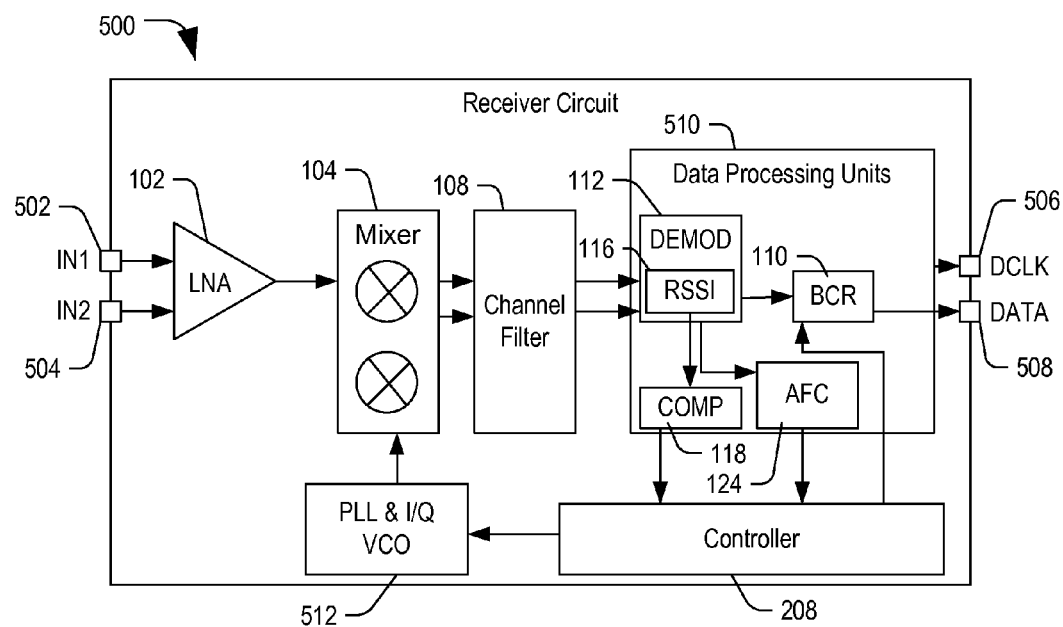
FIG. 5 is a block diagram of a receiver circuit configured to dynamically adjust receiver parameters in response to detecting a collision with respect to a received packet.

FIG. 5 is a block diagram of a receiver circuit 500 configured to dynamically adjust receiver parameters in response to detecting a collision with respect to a received packet. Receiver circuit 500 includes a first input (IN1) 502 and a second input (IN2) 504, which are coupled to inputs of LNA 102, which has an output coupled to an input of a mixer 104. Mixer 104 includes a control input coupled to an output of a phase locked loop (PLL) and In-phase/Quadrature (I/Q) voltage controlled oscillator (VCO) 512 for receiving a local oscillator signal. Mixer 104 further includes first and second outputs coupled to corresponding inputs of channel filter 108 for providing in-phase (I) and quadrature (Q) signals to channel filter 108. Channel filter 108 includes first and second outputs for providing filtered I and Q signals to data processing unit 510. In this illustrated example, data processing unit 510 includes demodulator 112 coupled to the I and Q outputs of channel filter 108 and including an output coupled to BCR circuit 110, which has an output coupled to a data pin 508. Demodulator 112 further includes an RSSI circuit 116 including an output coupled to an input of a comparator 118, which has an output coupled to controller 208. Data processing unit 510 is also coupled to a data clock pin 506 for providing a data clock signal. The I and Q outputs of channel filter are coupled to inputs of AFC circuit 124, which has a third input coupled to the output of demodulator circuit 112 and an output coupled to controller 208. Controller 208 has an output coupled to PLL & I/Q VCO 512 and an output coupled to BCR circuit 110.

In an example, the receiver circuit 500 is a fully integrated receiver with an embedded microcontroller unit (MCU) as the controller 208. In an alternative embodiment, the controller 208 may be implemented as a general purpose or special purpose processor configured to execute instructions stored in memory. The controller 208 operates on instructions stored in a memory (not shown). Receiver circuit 500 can include peripheral circuits, such as a real time clock (RTC) and one or more timers that can be used to provide the periodic or time-varying input for calculating the timers, such as preamble timer 210, sync timer 212, and a third timer (such as a timer related to detection of a packet payload). Alternatively, one or more timers may be implemented in software executing on controller 208. As persons of ordinary skill in the art understand, however, a variety of types of timer hardware or software may be used in exemplary embodiments, depending on factors such as cost, complexity, circuit space, etc.

In operation, controller 208 detects a colliding packet based on an abrupt change in the RSSI as determined from RSSI circuit 116 and the output of comparator 118. In response thereto, controller 208 is operable to control the AFC 124, BCR 110, and the PLL & I/Q VCO to adjust parameters of the receiver to receive the preamble, sync word, and payload of the colliding packet.

In conjunction with the circuits and methods described above with respect to FIGS. 1-5, a receiver is configured to detect a packet collision and, in response thereto, to adjust the receive parameters of the receiver circuit in time to receive the colliding packet. In an example, when a received packet is corrupted by a packet collision, controller 208 adjusts the frequency and phase of the receiver and enables preamble detection to attempt to capture the preamble, sync word, and payload of the colliding packet.

Although the present invention has been described with reference to preferred embodiments, workers skilled in the art will recognize that changes may be made in form and detail without departing from the scope of the invention.

What is claimed is:

1. A method of handling a collision event between a first and second transmission, the method comprising: detecting a collision event between the first and second transmissions while processing the first transmission at a receiver; halting decoding of the first transmission in response to detecting the collision; adjusting receive parameters to receive the second transmission; and detecting a preamble portion of the second transmission using the adjusted receive parameters.

2. The method of claim 1, wherein adjusting the receive parameters comprises changing automatic frequency compensation parameters to frequency lock to the second transmission.

3. The method of claim 1, wherein adjusting the receive parameters comprises changing bit clock recovery parameters to phase lock to a modulation of the second transmission.

4. The method of claim 1, wherein detecting the collision event comprises: determining a received signal strength at an output of a channel filter; averaging the received signal strength over time to produce an average received signal strength; and detecting the collision event when the average received signal strength exceeds a threshold.

5. The method of claim 1, wherein detecting the collision event comprises: determining a change in a received signal strength corresponding to the second transmission; and detecting the collision when the change exceeds a threshold.

6. The method of claim 1, wherein detecting the collision event comprises detecting at least one of a preamble and a synchronization word of the second transmission concurrently with processing the first transmission.

7. The method of claim 1, wherein detecting the second transmission comprises: enabling a preamble detector to detect a preamble of the second transmission; starting a first timer; and generating an error signal when a count associated with the first timer exceeds a first threshold before the preamble is detected.

8. The method of claim 7, wherein when the preamble is detected, the method further comprises: enabling a synchronization word detector to detect a synchronization word of the second transmission; starting a second timer; and generating an error signal if a count associated with the second timer exceeds a second threshold before the synchronization word is detected.

9. The method of claim 1, wherein when the collision is detected, the method further comprises: enabling a synchronization word detector to detect a synchronization word of the second transmission; starting a second timer; and generating an error signal if a count associated with the second timer exceeds a second threshold before the synchronization word is detected.

10. A receiver circuit comprising: a demodulator configured to receive a first signal and to demodulate the first signal to produce a demodulated signal; a data handler coupled to the demodulator and configured to process the demodulated signal to extract data; a collision detector coupled to the demodulator and configured to detect a collision event between the first signal and a second signal, the collision detector configured to provide a collision detection signal in response to detecting a collision event; and a controller coupled to the demodulator and the collision detector, the controller configured to adjust receive parameters of the demodulator to detect a preamble portion of the second signal in response to the collision detection signal.

11. The receiver circuit of claim 10, wherein the controller is coupled to the data handler and configured to control the data handler to terminate processing of the first signal and to prepare to receive the second signal in response to the collision detection signal.

12. The receiver circuit of claim 10, wherein the data handler comprises: a preamble detector configured to detect the preamble of one of the first signal and the second signal and to timeout after a period of time if the preamble is not detected; and a synchronization word detector configured to detect a synchronization word of the one of the first signal and the second signal and to timeout after a period of time if the synchronization word is not detected.

13. The receiver circuit of claim 12, wherein the controller is configured to selectively control the preamble detector and the synchronization word detector to enable reception of the second signal.

14. The receiver circuit of claim 10, wherein: the controller includes at least one timer; and wherein the controller is configured to place the receiver in a low power state when the data handler does not detect the second signal.

15. The receiver circuit of claim 10, wherein the collision detector comprises: a received signal strength indicator (RSSI) circuit configured to detect a received signal strength of one of the first signal and the second signal; a differentiator including an input coupled to the RSSI circuit and including an output for providing a differentiator output signal; and a comparator including a first input coupled to the output of the differentiator, a second input for receiving a reference signal, and an output coupled to the controller; wherein the collision detector detects a collision when the differentiator output signal exceeds the reference signal.

16. The receiver circuit of claim 10, further comprising signal processing circuitry including: a tuning system including a control input and including an output for providing a local oscillator signal; a mixer including an input to receive a received signal, an oscillator input coupled to the output of the tuning system for receiving the local oscillator signal, and an output for providing an intermediate frequency signal; a channel filter including an input coupled to the output of the mixer and including an output for providing the signal; and an automatic frequency compensation circuit including an input coupled to the output of the channel filter, a control input coupled to the first control output of the controller, and an output coupled the control input of the tuning system.

17. The receiver circuit of claim 16, further comprising: a bit clock recovery circuit including a first input coupled to the output of the channel filter, a control input coupled to a third control output of the controller, and an output coupled to an input of the data handler; and wherein the controller controls automatic frequency compensation circuit to frequency lock to a frequency of the second signal; and wherein the controller controls the bit clock recovery circuit to control the demodulator to phase lock to a packet associated with the second signal.

18. A receiver comprising: a decoder including an input for receiving a first signal transmission, the decoder configured to detect at least one of a preamble, a synchronization word, and a payload of the signal; and a controller configured to detect a collision event between the first signal transmission and a second signal transmission, to adjust one or more receive parameters of the decoder, and to enable the decoder to detect a preamble of a second signal transmission in response to detecting the collision event.

19. The receiver of claim 18, wherein the decoder comprises: a demodulator configured to receive the first signal transmission and to demodulate the first signal transmission to produce a demodulated signal; a data handler coupled to the demodulator and configured to process the demodulated signal to extract data; and wherein the one or more parameters include automatic frequency compensation parameters of the demodulator to frequency lock to a frequency of the second signal transmission causing the collision event.

20. The receiver of claim 19, wherein the controller selectively controls the data handler to terminate processing of the demodulated signal in response to detecting the collision event.

* * * * *